United States Patent [19]
Morris

[11] Patent Number: 4,759,528
[45] Date of Patent: Jul. 26, 1988

[54] VALVE ACTUATOR

[75] Inventor: Donald H. Morris, Agoura, Calif.

[73] Assignee: Rockwell International Corporation, El Segundo, Calif.

[21] Appl. No.: 121,184

[22] Filed: Nov. 16, 1987

[51] Int. Cl.⁴ ............................................. F16K 31/06
[52] U.S. Cl. ........................ 251/129.06; 251/129.16; 251/129.1; 251/368; 335/296; 335/297
[58] Field of Search ...................... 251/129.06, 129.16, 251/129.01, 368; 335/296, 297

[56] References Cited

U.S. PATENT DOCUMENTS 4,201,837  5/1980  Lupinski .................... 335/297 X
4,403,765  9/1983  Fisher .......................... 251/65

Primary Examiner—Arnold Rosenthal
Attorney, Agent, or Firm—H. Fredrick Hamann; Harry B. Field; David C. Faulkner

[57] ABSTRACT

A lightweight propellant valve is provided which incorporates a magnetic flux-shifting actuator associated with a magnetic coil for determining a flux flow path therein.

2 Claims, 1 Drawing Sheet

VALVE ACTUATOR

BACKGROUND OF THE INVENTION

1. Field of the Invention

The present invention relates to valve actuators, and more particularly to flux shifting valve actuators based upon stress sensitive amorphous magnetic material.

2. Background Art

In prior magnetic flux-shifting fluid valves, the shifting of a magnetic flux causes a movable valve element to reposition in order to control the flow of a fluid therethrough.

As disclosed in U.S. Pat. No. 4,072,918 to Read, Jr. an electromagnetic bistable actuator employs a first magnetic circuit adapted for maximizing flux flow through an armature and a second magnetic circuit adapted to maintain magnetization of a permanent magnet.

Yet another functional magnetic flux-shifting fluid valve is disclosed in U.S. Pat. No. 4,403,765 to Fisher. Fisher utilizes in part, two permanent magnets, one having a relatively high coercive force and the other having a relatively low coercive force. A change in the magnetization of the magnet having a relatively low coercive force results in the fluxes of the two magnets being either in series across a working air gap or in parallel through a diverting shunt path in order to operate the valve.

SUMMARY OF THE INVENTION

The present invention is directed to a novel lightweight propellant valve including a magnetic flux-shifting actuator associated with a magnetic coil for determining a flux flow path by rotating the magnetic domains of a stress sensitive amorphous metal.

Therefore, it is an object of the present invention to provide a lightweight fast acting propellant valve which functions to control fluid flow and is magnetically operated by a novel magnetic flux-shifting actuator.

Other objects, advantages and novel features of the present invention will become apparent from the following detailed description when read in conjunction with the accompanying drawing.

DETAILED DESCRIPTION OF THE PREFERRED EMBODIMENTS

Figure 1:
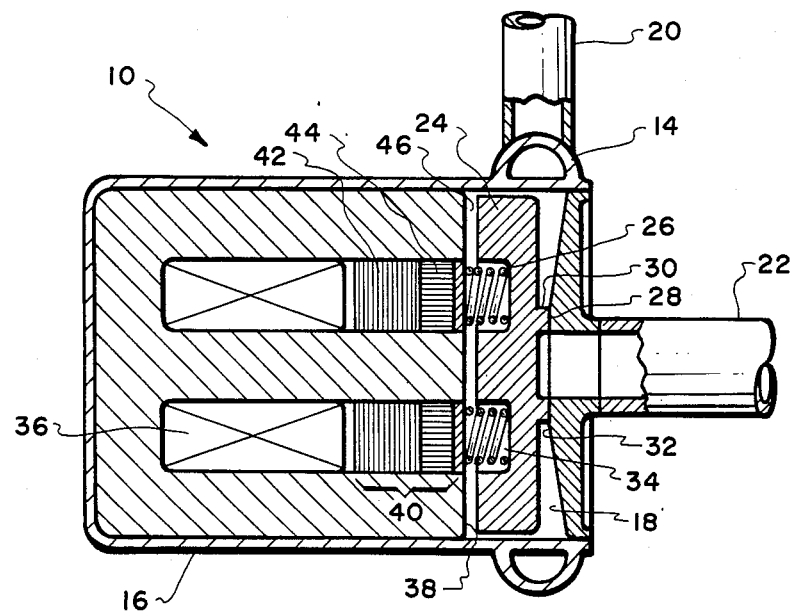
FIG. 1 is a schematic, cross-sectional side view of a valve embodying the invention in a preferred embodiment.

The invention is best understood by reference to the drawings wherein like parts are designated with like numerals throughout.

As shown in the drawings, the valve 10 of the present invention includes a housing 12 defining a top portion 14 and a base portion 16. A housing cavity 18 is formed intermediate the top portion and base portion and is provided with an inlet port 20 and an outlet port 22 communicating with the housing cavity for the ingress and egress of a fluid passing through the valve assembly. Within cavity 18 is a spring biased armature 24 movable from a closed position to an open position. The spring 26 is a helical compression spring made of a nonmagnetic material.

As shown in the Figures, armature 24 is in a closed position wherein a first valve seat 28 formed by an annular ridge 30 engages inner surface 32 of the housing top portion in an axial arrangement. The armature is caused to be held in this position by biasing spring 26 seated within an annular recess 34 in the armature.

In the base portion 16 of the valve housing there is located a magnetic flux-shifting actuator, indicated at 40, a coil 36 and a valve seat surface 38. The annular coil 36 is aligned along the axis of the housing. Leads (not shown) to the coil are accessible exteriorly of the housing. The annular magnetic flux-shifting actuator 40 associated with the annular magnetic coil 36 comprises an annular piezoelectric transducer 42 and an annular stress sensitive amorphous magnetic material 44 such as Metglas 2605SC (Allied Corp., Parsippany, N.J. The amorphous magnetic material may be an alloy of silicon, boron, carbon, iron, nickel or combinations thereof. When stressed by the energized piezoelectric transducer, the amorphous magnetic material modulates the magnetic coil magnetic flux by rotating the magnetic domains of the amorphous magnetic material which controls the magnetic flux pathway.

Without activation of the piezoelectric transducer 42 the amorphous material 44 is oriented so that the flux path is through the amorphous material and minimal flux passes across the air gap 46 and through armature 24 so that the valve is not actuated. With actuation of the piezoelectric material the magnetic domains rotate and stress the amorphous material resulting in the magnetic path passing through the air gap and armature actuating the valve. Deactivating the piezoelectric material causes the magnetic path to travel through the amorphous material. In this mode, the valve closes with the aid of the springs and some differential pressure due to flow. Thus the valve function is actuated by piezoelectric actuator, not the turning on and off of the primary coil. The advantage of this is that coil buildup and decay times (actuation) are limited by the coil inductive and applied voltage, whereas the piezoelectric actuation times are limited by capitance and may be several orders of magnitude faster. The general concept is to internally switch the magnetic flux path, not build up and collapse the entire magnetic field.

When the armature is seated against the housing top portion as shown in FIG. 1, the magnetic flux-shifting actuator associated with the magnetic coil retains the flux flow induced by the coil within the housing base of the valve. In other words, the flux is contained so that there is no flow across air gap 46 and the armature so as to cause the armature to retract from the outlet port thereby allowing flow of fluid therethrough. When it is desired to function the valve, the magnetic flux-shifting actuator is energized in conjunction with the coil and the flux is allowed to flow across the air gap and through the armature causing the armature to pull away from surface while compressing spring to open the valve.

Figure 2:
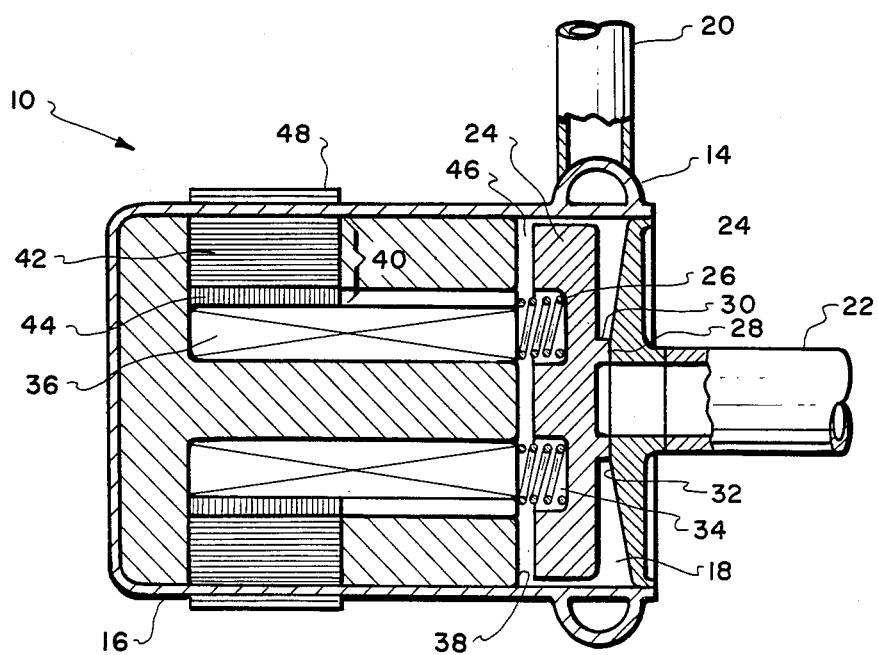
FIG. 2 is a schematic, cross-sectional side view of a valve disclosing one embodiment of the valve and magnetic flux-shifting actuator.

In FIG. 2, a modification of the design of the magnetic flux-shifting actuator is shown. In this embodiment, there is additionally provided a high modulus composite overlap 48 made of graphite epoxy. The amorphous material is used to directly introduce a resistance on the magnetic flux path to modulate the valve, which is equivalent to increasing/decreasing the flux gap allowing the armature to be activated. The composite overlap 48 provides lightweight containment of the amorphous material to allow it to be adequately stressed with minimal displacement of he piezoelectric actuator.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A lightweight propellant valve comprising in combination:
   (a) a housing defining a top and base portion;
   (b) a housing cavity intermediate the top and base portion;
   (c) an inlet port and an outlet port communicating with the housing cavity;
   (d) a spring biased armature located within the cavity and movable from a closed position to an open position;
   (e) armature seating surfaces;
   (f) a magnetic coil disposed within the housing based portion;
   (g) a magnetic flux-shifting actuator associated with the magnetic coil and further comprising in combination;
      (i) a piezoelectric transducer;
      (ii) a stress-sensitive amorphous magnetic material which when stressed by the transducer modulates the magnetic coil magnetic flux by rotating the magnetic domains on the amorphous magnetic material; and
   (h) means for activating the magnetic-flux shifting actuator to modify a magnetic flux path such that a flux flow is established from within the base portion of the housing through the armature to move the armature from a closed position to an open position.

2. The propellant valve of claim 1 wherein the stress sensitive magnetic material is an alloy of iron, nickel, silicon, boron, carbon or combinations thereof.

* * * * *